(12) United States Patent
Behaghel et al.

(10) Patent No.: US 8,764,385 B2
(45) Date of Patent: Jul. 1, 2014

(54) AXIAL-CENTRIFUGAL COMPRESSOR HAVING SYSTEM FOR CONTROLLING PLAY

(75) Inventors: Laurent Donatien Behaghel, Montgeron (FR); Eddy Stephane Joel Fontanel, Paris (FR); Benjamin Philippe Pierre Pegouet, Melun (FR)

(73) Assignee: SNECMA, Paris (FR)

( * ) Notice: Subject to any disclaimer, the term of this patent is extended or adjusted under 35 U.S.C. 154(b) by 688 days.

(21) Appl. No.: 13/001,155

(22) PCT Filed: Jun. 29, 2009

(86) PCT No.: PCT/EP2009/058101
§ 371 (c)(1),
(2), (4) Date: Dec. 23, 2010

(87) PCT Pub. No.: WO2010/000691
PCT Pub. Date: Jan. 7, 2010

(65) Prior Publication Data
US 2011/0129332 A1      Jun. 2, 2011

(30) Foreign Application Priority Data
Jul. 1, 2008   (FR) ...................................... 08 54456

(51) Int. Cl.
*F01D 25/14*   (2006.01)
(52) U.S. Cl.
USPC ....................................................... 415/131
(58) Field of Classification Search
USPC ............................... 415/14, 47, 108, 131, 144
See application file for complete search history.

(56) References Cited

U.S. PATENT DOCUMENTS

| | | | | |
|---|---|---|---|---|
| 2,837,270 A * | 6/1958 | Chapman | ........................ | 415/17 |
| 3,892,499 A * | 7/1975 | Strub | ............................ | 415/179 |
| 4,248,566 A * | 2/1981 | Chapman et al. | ............... | 415/26 |
| 4,264,271 A | 4/1981 | Libertini | | |
| 4,687,412 A | 8/1987 | Chamberlain | | |
| 5,186,601 A * | 2/1993 | Treece et al. | ................ | 415/58.4 |
| 5,611,197 A * | 3/1997 | Bunker | ......................... | 60/806 |
| 6,273,671 B1* | 8/2001 | Ress, Jr. | ........................... | 415/1 |
| 6,506,015 B2* | 1/2003 | Nagata et al. | ............... | 415/173.1 |
| 6,585,482 B1* | 7/2003 | Liotta et al. | ................... | 415/116 |
| 7,293,953 B2* | 11/2007 | Leach et al. | ................... | 415/14 |
| 2009/0056125 A1* | 3/2009 | Howe et al. | ..................... | 29/889 |

FOREIGN PATENT DOCUMENTS

| | | |
|---|---|---|
| DE | 2 165 528 | 7/1973 |
| EP | 0 578 285 | 1/1994 |
| FR | 2698667 | 6/1994 |
| FR | 2 722 836 | 1/1996 |
| FR | 2722836 | 1/1996 |

OTHER PUBLICATIONS

International Search Report Issued Oct. 15, 2009 in PCT/EP09/058101 filed Jun. 29, 2009.

* cited by examiner

*Primary Examiner* — Edward Look
*Assistant Examiner* — Liam McDowell
(74) *Attorney, Agent, or Firm* — Oblon, Spivak, McClelland, Maier & Neustadt, L.L.P.

(57) ABSTRACT

In an axial-centrifugal compressor, the rotor of which includes an impeller, axial play is controlled by a special air ventilation to the rotor, by a circuit including two parallel arms, flow rates of which are both controlled by respective veins, and moreover the temperature in one of them is changed by a heat exchanger. The ventilation air is thus controlled, both in terms of temperature and flow rate.

14 Claims, 2 Drawing Sheets

AXIAL-CENTRIFUGAL COMPRESSOR HAVING SYSTEM FOR CONTROLLING PLAY

BACKGROUND OF THE INVENTION

The subject of this invention is an axial-centrifugal compressor having a system for controlling axial play.

An axial-centrifugal compressor comprises a first conventional portion, where the rotor and the stator are cylindrical and concentric around the axis line of the compressor, and then a portion where they spread out in a radial direction so that the corresponding portion of the rotor, called an impeller extends beyond the stator along the axis line. One of its advantages is to reduce the bulkiness of the machine in the direction of the axis and to produce more compact and more lightweight machines.

The yield of the compressors and of the machines to which they may be integrated greatly depends on the plays existing between the rotor and the stator and which are responsible for energy losses in the flow of the gases. It is conventional to adjust these plays by ventilation of a gas at the intended temperature and flow rate in order to produce differential thermal expansion between the rotor and the stator in the radial direction. Air taken from a section of the compressor is generally used in order to benefit from its pressurization and to have it circulate in conduits or cavities, towards the location where differential thermal expansion may be controlled. With a valve, it is possible to adjust the ventilation gas flow rate and the amount of heat which it provides, on the contrary draws off, according to the correction of the play required at each running speed of the machine.

The system for adjusting radial play is however applied to the stators in conventional devices. Further, these devices have only been applied to axial compressors.

There further exists ventilation devices for the rotor, in which another air flow originating from the stator crosses a radial arm supporting the rotor before penetrating into a central cavity of the latter. These ventilation devices have the only purpose of preventing excessive heating of the rotor. In particular, they are not controlled in terms of flow rate, which does not allow them to exert any play adjustment.

However mention should be made of French patent 2 698 667, wherein an axial play adjustment of an impeller of an axial-centrifugal compressor is achieved by a balance of pressure forces; of U.S. Pat. Nos. 4,687,412 and DE 21 65528 wherein the axial play is adjusted by mechanical and static means (shims or washers in bolted assemblies); and of patent FR-A-2 722 836 where it is adjusted by axial displacement, controlled by a servo-controlled actuator of the abutment bearing of the rotor.

BRIEF SUMMARY OF THE INVENTION

The object of the invention is to achieve control of the axial play of the spread-out portion of an axial-centrifugal compressor and of its essentially axial play by differential thermal expansions, which does not seem to have been suggested previously. The use of conventional ventilation devices would not give good results since the axial play would be controlled at the same time as the radial play of the first portion of the compressor, which would be incompatible for obtaining satisfactory results.

The compressor according to the invention is characterized in that it comprises a rotor and a stator separated by a flow vein and each having a cylindrical portion and then a spread-out portion, the cylindrical portions being concentric with an axis line and distant by radial play, the spread-out portions being aligned along the axis line and distant by axial play, characterized in that it comprises a ventilation path exerting adjustment of the axial play, extending from the stator up to the rotor and comprising a first arm equipped with a first valve for adjusting the opening, and a second arm equipped with a heat exchanger and a second valve for adjusting the opening.

With this device, it is possible to carry out sufficient adjustment of the axial play without incurring any adjustment incompatibility between the axial play and the radial play, for reasons which will be detailed later on.

As both arms have an adjustable flow and the second arm imparting a change in temperature to the drawn gas for the ventilation, the flow rate and the temperature of this gas are both adjustable which is necessary for establishing sufficient adjustment of the play together with sufficient ventilation.

According to various enhancements of the invention, the arms of the path have a common origin, in a cavity of the stator adjacent to the vein, and are supplied with the same gas: the second arm in reality is a bypass of the first. The device, comprising a single source from where the gas is taken, is simplified which is all the more appreciable since the axial-centrifugal compressors are small.

The heat exchanger advantageously exerts cooling of the second arm so that the device exerts contractions of the rotor. The typical operation then corresponds to larger play upon starting and upon accelerating, where the adjustment device is inactive at a cruising speed where it is applied. It is indeed advantageous to use the device at a cruising speed which is the most frequent and where the fuel is therefore mainly used, so that it is there where the most significant savings may be obtained. A larger play is accepted at acceleration and starting speeds which are of shorter duration, while total disappearance of the plays may damage the compressor. Further, cruising speeds are stable and well defined so that the plays are known with more accuracy then during unstable operating conditions.

The heat exchanger may consist of a section of the second arm passing through an outer cavity of the stator, which puts it into contact with fresher air and achieves the heat exchanger in a particularly simple way.

BRIEF DESCRIPTION OF THE DRAWINGS

A preferred but non-limiting embodiment of the invention will now be described in connection with the following figures.

DETAILED DESCRIPTION OF THE INVENTION

Figure 1:
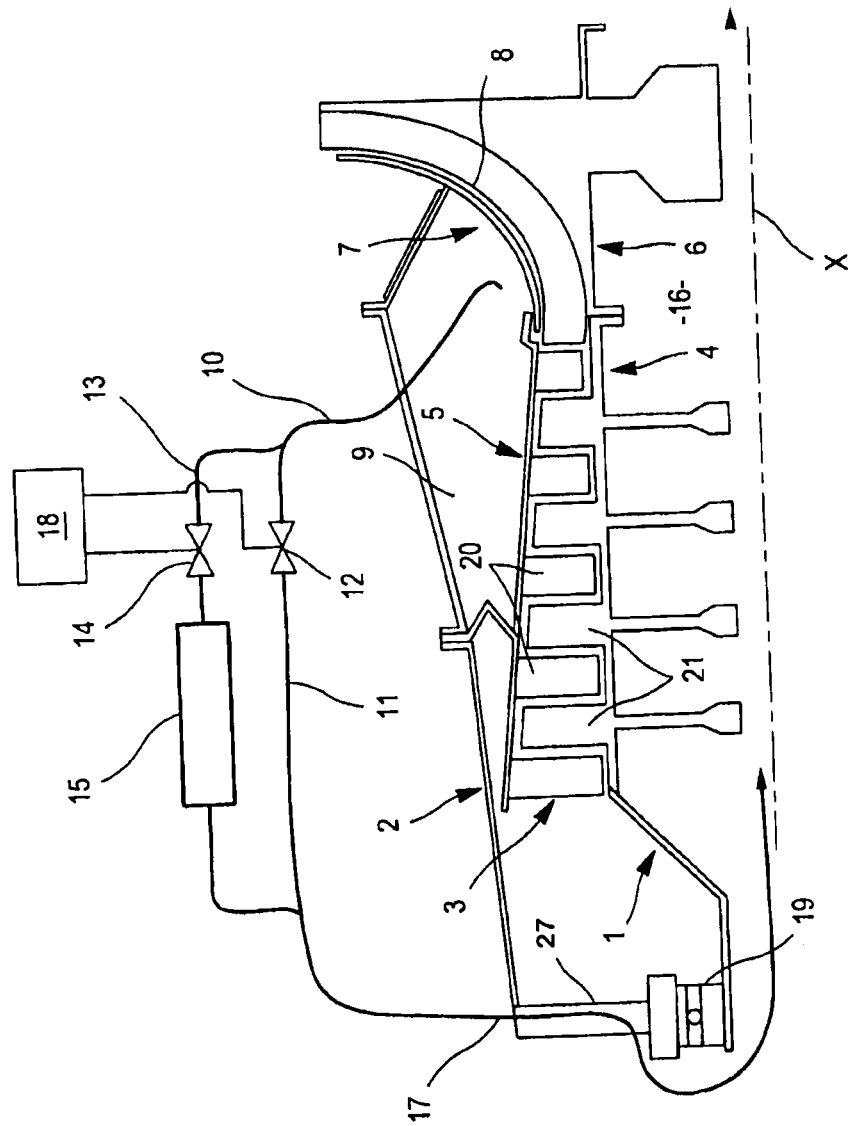
FIG. 1 is a general view of the compressor and of the device for controlling play.
Figure 2:
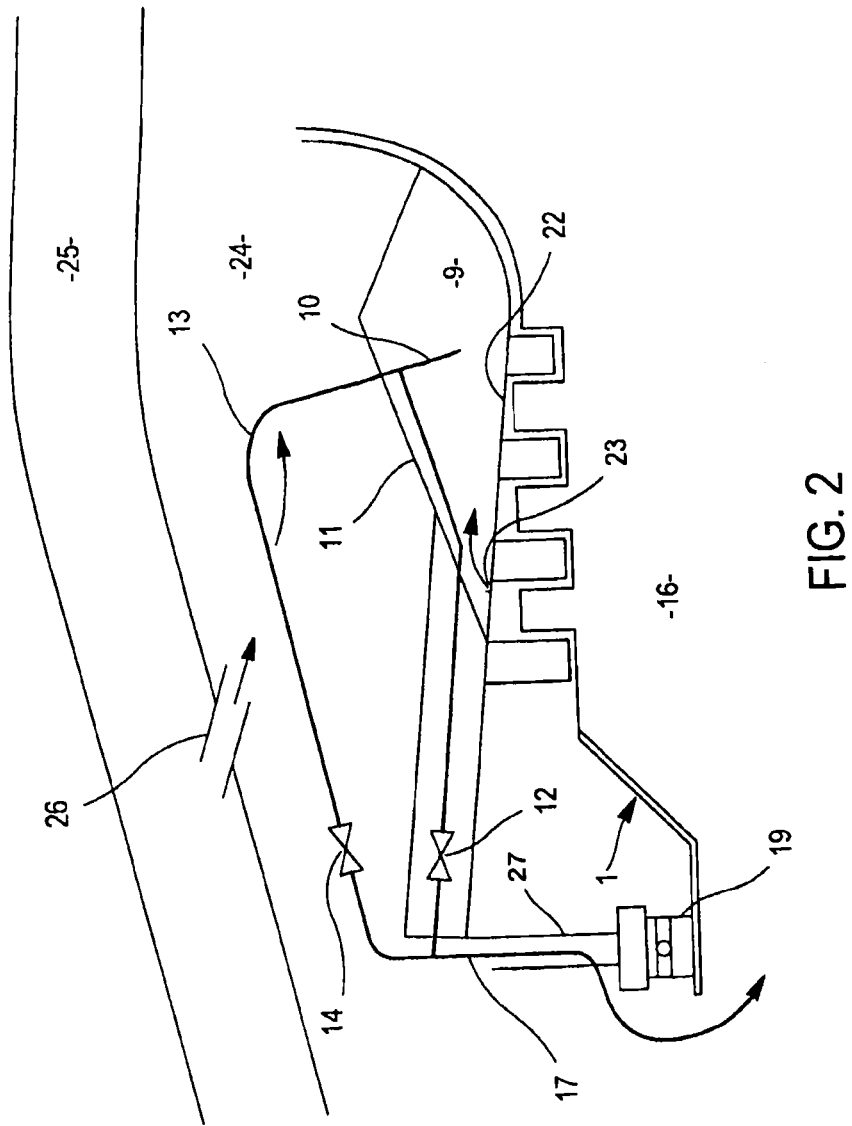
FIG. 2 is a more detailed view of the control device.

The axial-centrifugal compressor comprises a rotor 1 and a stator 2 separated by a vein 3 for gas flow. The rotor 1 and the stator 2 each have an substantially cylindrical axial portion, 4 or 5 respectively, and then a spread-out portion, 6 or 7 respectively spread out. The portion 6 of the rotor 1 is the impeller. It is the axial play 8 between these spread-out portions 6 and 7 which should be adjusted. Its value is typically of a few tens of millimeters at rest (0.7 or 0.8 mm for example).

The stator 2 includes cavities 9 around the vein 3. A conduit 10 opens out into one of them and draws a flow of its gas contents. It is then divided into a first arm 11 equipped with a first valve 12 and into a second arm 13 equipped with a second valve 14 and with a heat exchanger 15. The arms 11 and 13 then join together and their flows end up in a cavity 16 of the rotor 1 through a common conduit 17. This however is not necessary, the flows may remain separate up to the cavity 16. A control system 18, only outlined, controls the openings of the valves 12 and 14 according to the speed of the machine, known by pressure, temperature, rotational speed sensors, etc. which measure these parameters in various points. It is thereby possible to influence the gas flow rate provided to the cavity 16, and its temperature by varying the proporition of this gas passing through the heat exchanger 15. The consequence of this is a modification of the axial play 8, which may be reduced by several tenths of a millimeter (0.3 or 0.4 mm for example which gives a resulting play of less than 0.5 mm by substraction of the previous values, and which is quite acceptable). The adjustment of the two flow rates in the arms 11 and 13 is indicated, so as to vary by a sufficient extent the amount of heat extracted from the latter. The first arm 11 is used above all for ensuring ventilation at all the speeds of the machine where significant cooling (through the second arm 13) is not accomplished. It moreover allows heating gas to be provided to the rotor 1, in order to increase the axial play 8 during the starting phases and to ensure safe operation. The controlling is conducted by the control system 18 according to tests and measurements which precede actual operation of the compressor and which have allowed the determination of the axial plays and the values by which they may be reduced. The control system 18 is preferably active at cruising speed, where the operating characteristics are stable and well known, and also the plays, so that they may be reduced to a low value without any risk of completely suppressing them or causing wear to the machine by friction, or even of then damaging it more seriously, by titanium fires for example.

A few explanations should be given to show the relevance of the device. The rotor 1 is supported by the stator 2 by means of a bearing 19 opposite to the impeller 6, and, in spite of its axial-centrifugal design, the rotor 1 is much more extended in the axis line X than in the radial direction. The displacements consecutive to thermal expansions provided by the ventilation gas are therefore all the larger in locations away from the bearing 19, i.e. specifically at the impeller 6. The axial displacements of the axial portion 4 of the rotor 1 are more reduced, and anyhow are acceptable since they only marginally modify the distance between the stages of fixed 20 and mobile 21 vanes; and the expansions of the rotor 1 in the radial direction are much less significant than in the axial direction, of the order of a few hundredths of a millimeter (0.02 or 0.03 mm) to the point that they may possibly be neglected. A conventional system for controlling radial play between the axial portions 4 and 5 of the rotor 1 and of the stator 2 may be established in the stator 2, and adjusted independently of the device of the invention.

Thus, as this was mentioned, the arms 11 and 13 may be separate initially and open out into different cavities, but the use of a single ventilation gas source is appreciated. The cavity 9 where the ventilation gas is taken may be one of the cavities directly surrounding the inner skin 22 (giving onto the vein 3) of the stator 2, and which a tap 23 supplies with compressed air originating from a determined section of the compressor. The second arm 13 may extend in an outer cavity 24, which extends between the cavity 9 and a secondary vein 25 forming the outer portion of the stator 2. As the outer cavity 24 is fresher, the air passing through the second arm 13 is freshened without any other action and the heat exchanger 15 is therefore formed by this portion of the second arm 13 passing through the outer cavity 24. For more marked freshening, it would be possible to have the second arm 13 also pass through the secondary vein 25. By default, significant freshening is obtained by having it pass close to one of the scoops 26 which feed the outer cavity 24 from the secondary vein 25. Further downstream, the common conduit 17 may pass through one of the radial arms 27 supporting the rotor 1 and enter therein through an open end of the latter.

The invention claimed is:

1. An axial centrifugal compressor comprising:
   a rotor including an axial portion and a spread-out portion, the spread-out portion including an impeller of the rotor; and
   a stator, separated from the rotor by a flow vein, and including an axial portion and a spread-out portion, the axial portions of the rotor and stator being concentric with an axis line and spaced apart by an amount of radial play, and the spread-out portions of the rotor and stator being aligned along the axis line and spaced apart by an amount of axial play, and
   a ventilation circuit that adjusts the amount of axial play between the spread-out portions of the rotor and stator, the ventilation circuit extending from the stator into a cavity inside the rotor and including:
      a first arm having a first valve that adjusts an opening amount of the first arm, and
   a second arm having a heat exchanger and a second valve that adjusts an opening amount of the second arm.

2. The axial centrifugal compressor according to claim 1, wherein the first arm and the second arm have a common origin, in a cavity of the stator adjacent the flow vein.

3. The axial centrifugal compressor according to claim 1, wherein the second arm is disposed radially outward of the first arm.

4. The axial centrifugal compressor according to claim 1, wherein the heat exchanger of the second arm is provided by a section of the second arm passing through an outer cavity of the stator.

5. The axial centrifugal compressor according to claim 1, further comprising control circuitry that opens the second valve at a stable cruising speed of the axial centrifugal compressor.

6. The axial centrifugal compressor according to claim 1, wherein the cavity extends between a bearing supporting the rotor and the spread-out portion of the rotor.

7. The axial centrifugal compressor according to claim 1, wherein the ventilation circuit extends in a radial arm supporting the rotor.

8. The axial centrifugal compressor according to claim 1, wherein the amount of axial play between the spread-out portions of the rotor and stator is greater at startup as compared to during cruising.

9. The axial centrifugal compressor according to claim 1, wherein other than a common origin in a cavity of the stator, no part of the first arm is included as part of the second arm.

10. The axial centrifugal compressor according to claim 1, wherein the first arm and the second arm originate in a cavity of the stator and terminate in the cavity inside the rotor.

11. The axial centrifugal compressor according to claim 1, wherein the ventilation circuit adjusts the amount of axial play between the spread-out portions of the rotor and stator by controlling an air flow rate of each of the first arm and the second arm.

12. The axial centrifugal compressor according to claim 1, wherein, during startup, the second valve is completely closed so as to prevent air from flowing through the second arm having the heat exchanger.

13. The axial centrifugal compressor according to claim 1, wherein the first arm and the second arm include at least one common conduit portion shared therebetween.

14. The axial centrifugal compressor according to claim 1, wherein the ventilation circuit originates in a cavity of the stator and terminates in the cavity inside the rotor.

* * * * *